US012739355B2

(12) United States Patent
Fleureau et al.

(10) Patent No.: US 12,739,355 B2
(45) Date of Patent: Sep. 15, 2026

(54) METHOD AND APPARATUS FOR ENCODING, TRANSMITTING AND DECODING VOLUMETRIC VIDEO

(71) Applicant: INTERDIGITAL CE PATENT HOLDINGS, SAS, Paris (FR)

(72) Inventors: Julien Fleureau, Rennes (FR); Franck Thudor, Rennes (FR); Renaud Dore, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 82 days.

(21) Appl. No.: 17/763,745

(22) PCT Filed: Sep. 22, 2020

(86) PCT No.: PCT/EP2020/076355
§ 371 (c)(1),
(2) Date: Mar. 25, 2022

(87) PCT Pub. No.: WO2021/063732
PCT Pub. Date: Apr. 8, 2021

(65) Prior Publication Data

US 2022/0368879 A1 Nov. 17, 2022

(30) Foreign Application Priority Data

Sep. 30, 2019 (EP) .................................... 19306222
Jan. 7, 2020 (EP) .................................... 20305005

(51) Int. Cl.
*H04N 13/161* (2018.01)
*H04N 13/282* (2018.01)
*H04N 19/70* (2014.01)

(52) U.S. Cl.
CPC ......... *H04N 13/161* (2018.05); *H04N 13/282* (2018.05); *H04N 19/70* (2014.11)

(58) Field of Classification Search
CPC .... H04N 13/161; H04N 13/282; H04N 19/70; H04N 19/182; H04N 19/37; H04N 19/597
See application file for complete search history.

(56) References Cited

U.S. PATENT DOCUMENTS

2003/0085932 A1 5/2003 Samra
2013/0162625 A1 6/2013 Schmit et al.
(Continued)

FOREIGN PATENT DOCUMENTS

CN 103024597 A 4/2013
CN 103098468 A 5/2013
(Continued)

OTHER PUBLICATIONS

Shin et al. "[MPEG-I Visual] CE2-Related: Priority based View Pruning.", International Organization for Standardization, ISO/IEC JTC1/SC29/WG11, Document: MPEG2019/M49150, Gothenburg, Sweden, Jul. 2019, 6 pages. (Year: 2019).*
(Continued)

*Primary Examiner* — Tat C Chio
(74) *Attorney, Agent, or Firm* — Klintworth & Rozenblat LLP

(57) ABSTRACT

Methods, devices and stream for encoding, decoding and transmitting a multi-views frame are disclosed. A non-pruned MVD frame is obtained and an acyclic graph representing pruning precedence relations between views is determined. The MVD is pruned by using these precedence relations. The pruned MVD and data representative of the graph are encoded in the data stream. At the decoding, the contribution of each view for a pixel of a viewport frame to generate is determined as a function of the decoded pruning graph.

23 Claims, 5 Drawing Sheets

(56) References Cited

U.S. PATENT DOCUMENTS

| | | | | |
|---|---|---|---|---|
| 2013/0170558 | A1 | 7/2013 | Zhang | |
| 2014/0111611 | A1 | 4/2014 | Lecroart | |
| 2014/0205015 | A1 | 7/2014 | Rusert et al. | |
| 2015/0009350 | A1 | 1/2015 | Sarwari et al. | |
| 2015/0181229 | A1 | 6/2015 | Lin et al. | |
| 2016/0088281 | A1 | 3/2016 | Newton et al. | |
| 2016/0360200 | A1 | 12/2016 | Shimizu et al. | |
| 2017/0064309 | A1 | 3/2017 | Sethuraman et al. | |
| 2018/0084260 | A1 | 3/2018 | Chien et al. | |
| 2018/0131951 | A1 | 5/2018 | Hannuksela | |
| 2018/0288415 | A1* | 10/2018 | Li | H04N 19/157 |
| 2021/0006834 | A1* | 1/2021 | Salahieh | H04N 19/597 |

FOREIGN PATENT DOCUMENTS

| | | | |
|---|---|---|---|
| CN | 104412587 | A | 3/2015 |
| CN | 105165008 | A | 12/2015 |
| CN | 105830443 | A | 8/2016 |
| CN | 106416250 | A | 2/2017 |
| CN | 107925777 | A | 4/2018 |
| CN | 108288270 | A | 7/2018 |
| CN | 109691106 | A | 4/2019 |
| JP | 2012505569 | A | 3/2012 |
| JP | 2014520409 | A | 8/2014 |
| WO | 2010041998 | A1 | 4/2010 |

OTHER PUBLICATIONS

Shin et al, "ETRI response to Immersive Video CE-2: Optimized pruning order", International Organization for Standardization, ISO/IEC JTC1/SC29/WG11, Document: MPEG2019/M50030, Geneva, Switzerland, Oct. 2019, 6 pages.

Shin et al, "[MPEG-I Visual] CE2-related: Priority based View Pruning", International Organization for Standardization, ISO/IEC JTC1/SC29/WG11, Document: MPEG2019/M49150, Gothenburg, Sweden, Jul. 2019, 6 pages.

Fleureau et al, "An Immersive Video Experience with Real-Time View Synthesis Leveraging the Upcoming MIV Distribution Standard", Institute of Electrical and Electronics Engineers, 2020 IEEE International Conference on Multimedia & Expo Workshops (ICMEW), Jul. 6, 2020, London, United Kingdom, 2 pages.

Fleureau et al, "CE2.6.2 Graph-Based Pruning for Natural Contents", International Organization for Standardization, ISO/IEC JTC1/SC29/WG11, Document: MPEG2019/M52414, Brussels, Belgium, Jan. 2020, 14 pages.

Fleureau et al, "CE2.6.2 Graph-Based Pruning for Natural Contents", International Organization for Standardization, ISO/IEC JTC1/SC29/WG11, Document: MPEG2019/M52414, Brussels, Belgium, Jan. 2020, 24 pages.

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.

Anonymous, "Information Technology—Coding of Audio-Visual Objects—Part 10: Advanced Video Coding", International Standard, ISO/IEC 14496-10, Second Edition, Oct. 1, 2004, 280 pages.

Anonymous, "Series H: Audiovisual and Multimedia Systems—infrastructure of audiovisual services—Coding of moving video: High Efficiency Video Coding", International Telecommunication Union, Recommendation ITU-T H.265, Oct. 2014, 540 pages.

Anonymous, "Terminal Equipment and Protocols for Telematic Services", Information Technology—Digital Compression and Coding of Continuous-Tone Still images—Requirements and Guidelines, International Telecommunication Union (ITU), The International Telegraph and Telephone Consultative Committee (CCITT), Document: T.81, Sep. 1992, 186 pages.

ITU_T, "Advanced video coding for generic audiovisual services", ITU-T H.264, International Telecommunication Union, ITU-T Telecommunication Standardization Sector of ITU, Series H: Audiovisual and Multimedia Systems, Infrastructure of Audiovisual Services—Coding of Moving Video, Jan. 2012, pp. 1-680.

He, et al., "JVET AHG Report: 360° video coding tools, software and test conditions (AHG6)", Joint Video Experts Team (JVET) of ITU-T SG 16 WP 3 and ISO/IEC JTC 1/SC 29/WG 11 JVET-00006 V2, Jul. 3-12, 2019, 3pp.

Zhao, "Research on 3D video visual quality and enhancement processing", China Master's Theses Full-text Database (Information Technology Section), Jun. 30, 2014, 131 pages.

* cited by examiner

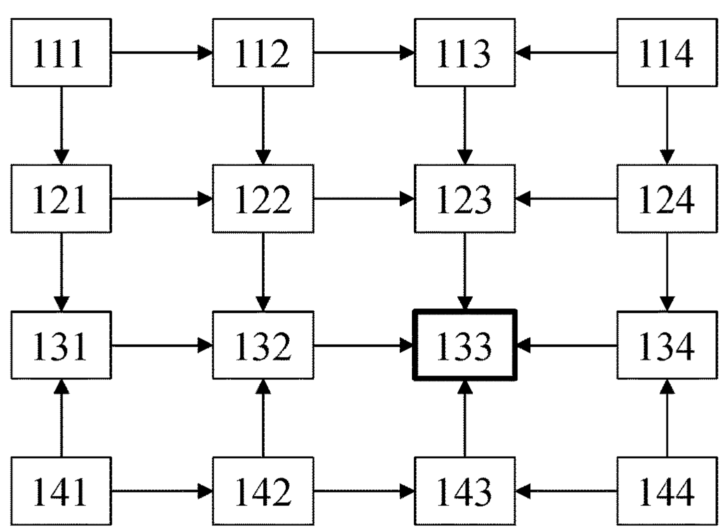
Figure 10
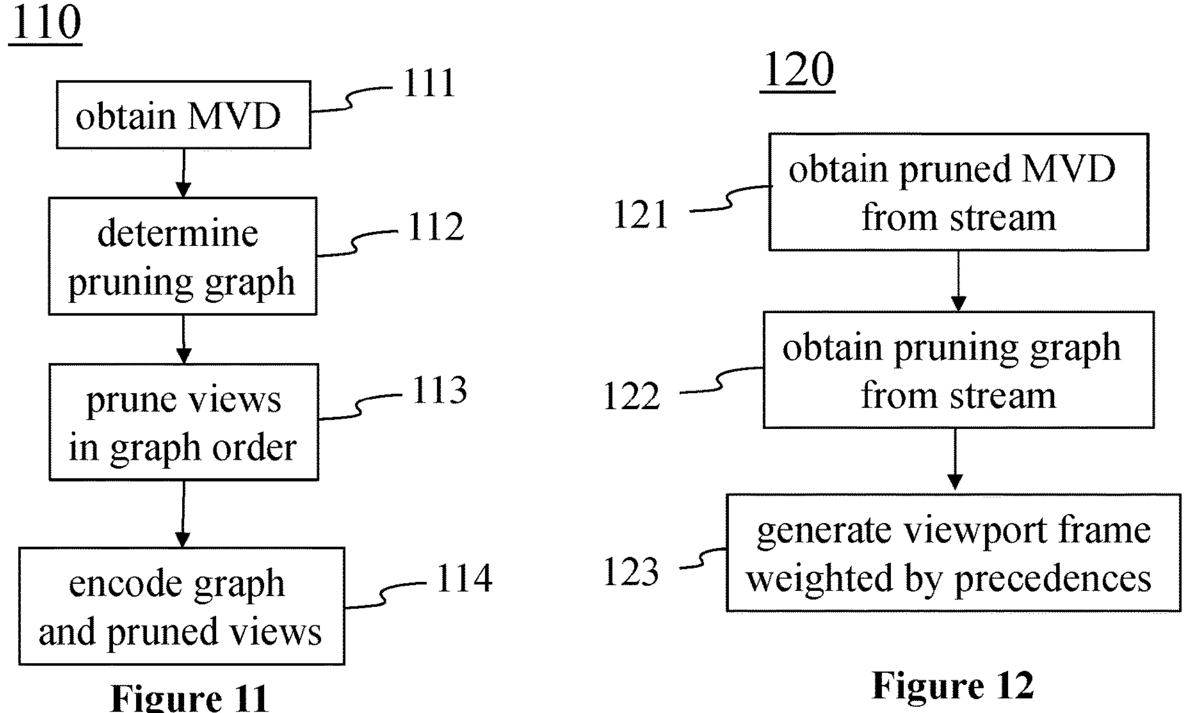
Figure 11
Figure 12

METHOD AND APPARATUS FOR ENCODING, TRANSMITTING AND DECODING VOLUMETRIC VIDEO

CROSS REFERENCE TO RELATED APPLICATIONS

This application is a U.S. National Stage Application under 35 U.S.C. 371 of International Patent Application No. PCT/EP2020/076355, filed Sep. 22, 2020, which is incorporated herein by reference in its entirety.

This application claims the benefit of European Patent Application Nos. 19306222.1, filed Sep. 30, 2019; and 20305005.9, filed Jan. 7, 2020, which are incorporated herein by reference in their entirety.

1. TECHNICAL FIELD

The present principles generally relate to the domain of three-dimensional (3D) scene and volumetric video content. The present document is also understood in the context of the encoding, the formatting and the decoding of data representative of the texture and the geometry of a 3D scene for a rendering of volumetric content on end-user devices such as mobile devices or Head-Mounted Displays (HIVID). Among other themes, the present principles relate to pruning pixels of a multi-views image to guarantee an optimal bitstream and rendering quality.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

3DoF+ contents may be provided as a set of Multi-View+ Depth (MVD) frames. Such contents may have been captured by dedicated cameras or can be generated from existing computer graphics (CG) contents by means of dedicated (possibly photorealistic) rendering. Volumetric information is conveyed as a combination of color and depth patches stored in corresponding color and depth atlases which are video encoded making use of regular codecs (e.g. HEVC). Each combination of color and depth patches represents a subpart of the MVD input views and the set of all patches is designed at the encoding stage to cover the entire scene while being as less redundant as possible. At the decoding stage, the atlases are first video decoded and the patches are rendered in a view synthesis process to recover the viewport associated to a desired viewing position. A problem of such a solution regards the way the patches are created to be sufficiently non-redundant and complementary.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method for encoding a pruned multi-views frame in a data stream. The method comprises

- obtaining an acyclic graph linking views of a non-pruned multi-views frame, links of the graph being representative of a view pruning precedence;

pruning pixels of views of the multi-views images in an order determined so that a first view is pruned after views linked to said first view by pruning precedence link; and encoding the graph and the pruned views in the data stream.

The present principles also relate to a device comprising a processor configured to implement this method.

The present principles also relate to a method of decoding a pruned multi-views frame from a data stream. The method comprises:

obtaining said pruned multi-views frame from said data stream;

obtaining an acyclic graph from the data stream, the graph linking views of said multi-views image, links of said graph being representative of a view pruning precedence;

generating a viewport frame according to a viewing pose by determining the contribution of each view of said pruned multi-views frame as a function of said pruning precedence of said graph.

The present principles also relate to a device comprising a processor configured to implement this method.

The present principles also relate to a data stream comprising:

data representative of a pruned multi-views frame; and data representative of an acyclic graph, the graph linking views of said multi-views image, links of said graph being representative of a view pruning precedence

4. BRIEF DESCRIPTION OF DRAWINGS

The present disclosure will be better understood, and other specific features and advantages will emerge upon reading the following description, the description making reference to the annexed drawings wherein:

FIG. 10 illustrates a 4×4 multi-view frame and an example pruning graph for such a MVD frame, according to a non-limiting embodiment of the present principles;

FIG. 11 illustrates a method for encoding a multi-view frame in a data stream according to a non-limiting embodiment of the present principles;

FIG. 12 illustrates a method for decoding a pruned multi-view frame from a data stream according to a non-limiting embodiment of the present principles.

5. DETAILED DESCRIPTION OF EMBODIMENTS

Figure 1:
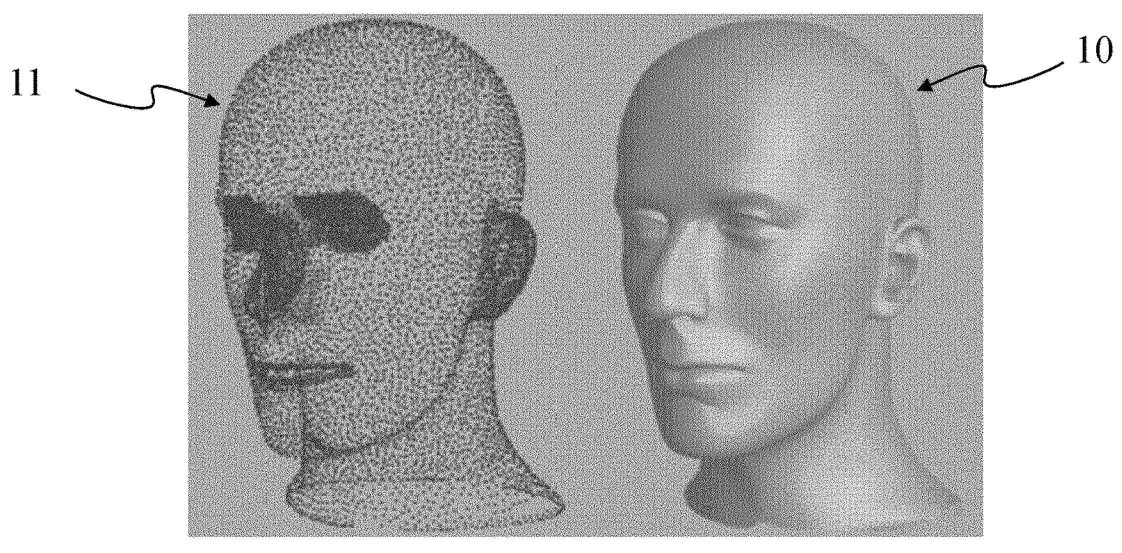
FIG. 1 shows a three-dimension (3D) model of an object and points of a point cloud corresponding to the 3D model, according to a non-limiting embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms “a”, “an” and “the” are intended to include the plural forms as well, unless the context clearly indicates otherwise. It will be further understood that the terms “comprises”, “comprising,” “includes” and/or “including” when used in this specification, specify the presence of stated features, integers, steps, operations, elements, and/or components but do not preclude the presence or addition of one or more other features, integers, steps, operations, elements, components, and/or groups thereof. Moreover, when an element is referred to as being “responsive” or “connected” to another element, it can be directly responsive or connected to the other element, or intervening elements may be present. In contrast, when an element is referred to as being “directly responsive” or “directly connected” to other element, there are no intervening elements present. As used herein the term “and/or” includes any and all combinations of one or more of the associated listed items and may be abbreviated as“/”.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:

- from a capture of a real object shot by a rig of cameras, optionally complemented by depth active sensing device;
- from a capture of a virtual/synthetic object shot by a rig of virtual cameras in a modelling tool;
- from a mix of both real and virtual objects.

A 3D scene, in particular when prepared for a 3DoF+ rendering may be represented by a Multi-View+Depth (MVD) frame. A volumetric video is then a sequence of MVD frames. In this approach, the volumetric information is conveyed as a combination of color and depth patches stored in corresponding color and depth atlases which are then video encoded making use of regular codecs (typically HEVC). Each combination of color and depth patches typically represents a subpart of the MVD input views and the set of all patches is designed at the encoding stage to cover the entire scene while being as less redundant as possible. At the decoding stage, the atlases are first video decoded and the patches are rendered in a view synthesis process to recover the viewport associated to a desired viewing position.

Figure 2:
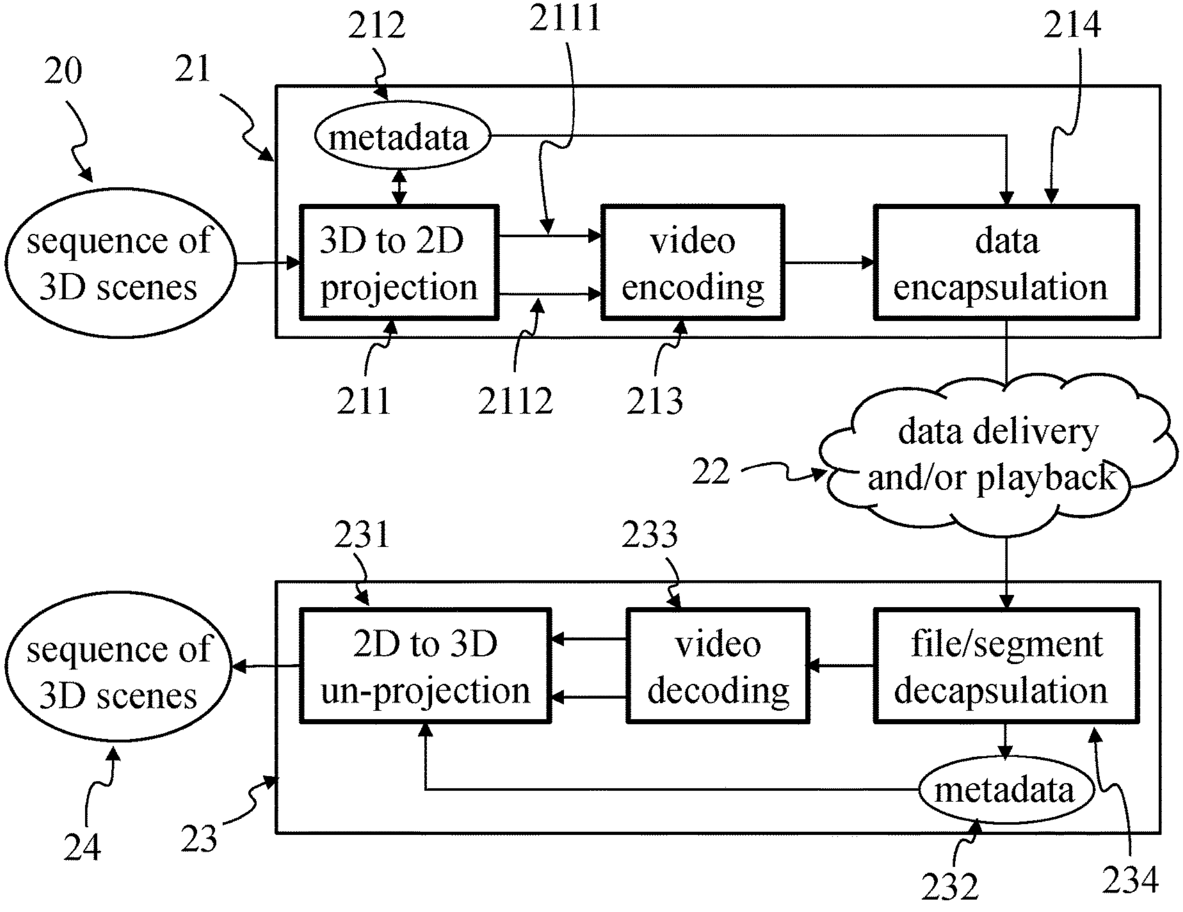
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3Dof+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:

- JPEG, specification ISO/CEI 10918-1 UIT-T Recommendation T.81, http s ://www. itu. int/rec/T-REC-T. 81/en;
- AVC, also named MPEG-4 AVC or h264. Specified in both UIT-T H.264 and ISO/CEI MPEG-4 Part 10 (ISO/CEI 14496-10), http://www.itu.int/rec/T-REC-H.264/en, HEVC (its specification is found at the ITU website, T recommendation, H series, h265, http://www.itu.int/rec/T-REC-H.265-201612-Fen);

- 3D-HEVC (an extension of HEVC whose specification is found at the ITU website, T recommendation, H series, h265, http://www.itu.int/rec/T-REC-H.265-201612-I/en annex G and I);
- VP9 developed by Google;
- AV1 (AOMedia Video 1) developed by Alliance for Open Media; or
- Future standards like Versatile Video Coder or MPEG-I or MPEG-V future versions.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. A circuit 231 uses metadata 232 to un-project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Figure 3:
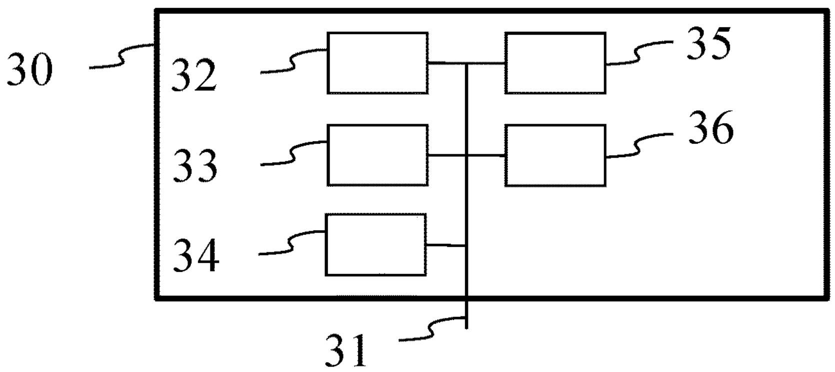
FIG. 3 shows an example architecture of a device which may be configured to implement a method described in relation with FIGS. 11 and 12, according to a non-limiting embodiment of the present principles.

FIG. 3 shows an example architecture of a device 30 which may be configured to implement a method described in relation with FIGS. 11 and 12. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word « register » used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 11 and 12, and belongs to a set comprising:

- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
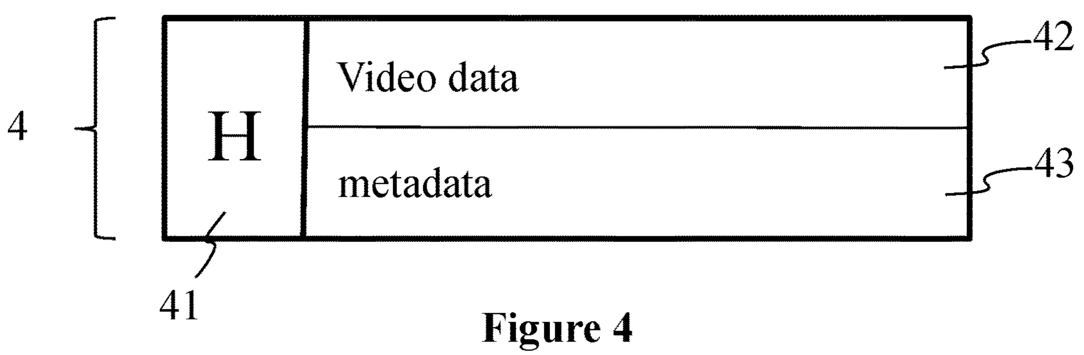
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the color and depth frames. Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
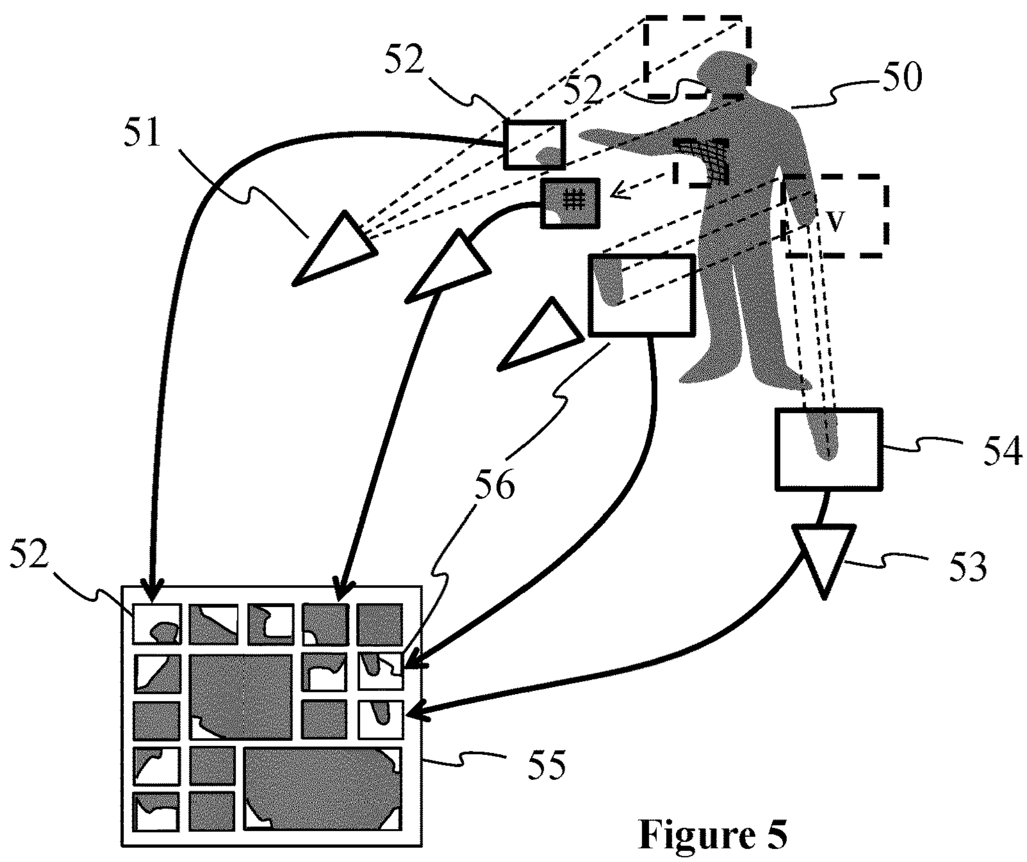
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping.

The clustering of the projected pixels yields a multiplicity of 2D patches, which are packed in a rectangular atlas 55. The organization of patches within the atlas defines the atlas layout. In an embodiment, two atlases with identical layout: one for texture (i.e. color) information and one for depth information. Two patches captured by a same camera or by two distinct cameras may comprise information representative of a same part of the 3D scene, like, for instance patches 54 and 56.

The packing operation produces a patch data for each generated patch. A patch data comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one or two atlases.

Figure 6:
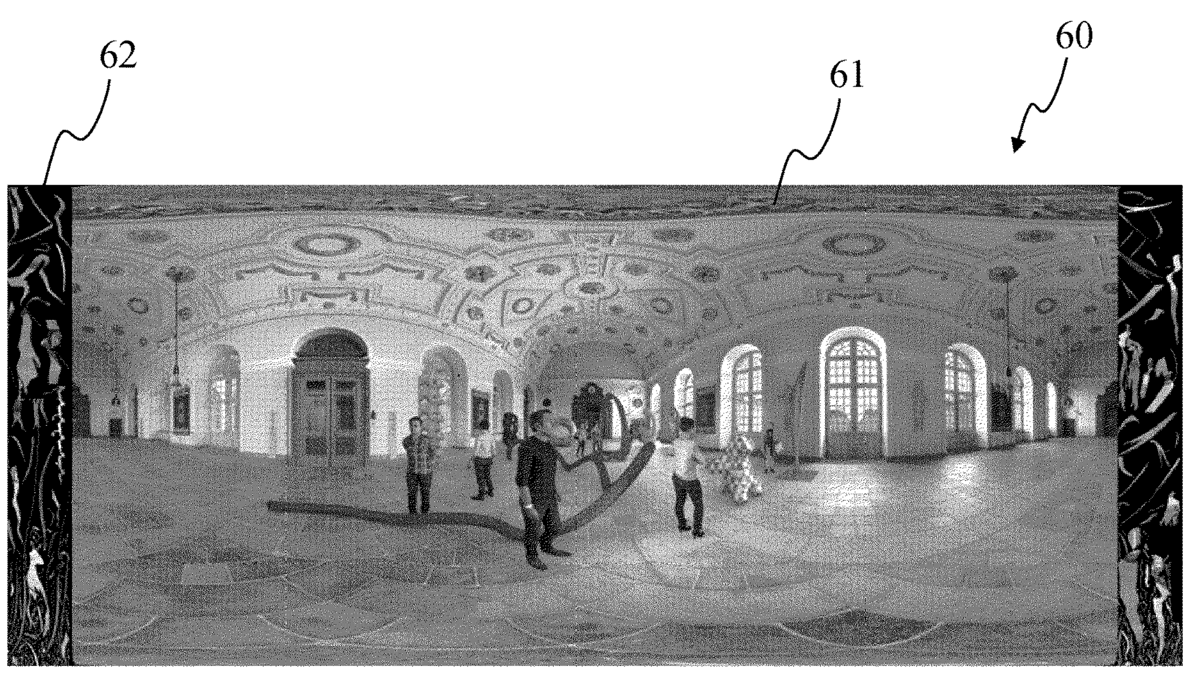
FIG. 6 shows an example of an atlas comprising the texture information of the points of a 3D scene, according to a non-limiting embodiment of the present principles.

FIG. 6 shows an example of an atlas 60 comprising the texture information (e.g. RGB data or YUV data) of the points of a 3D scene, according to a non-limiting embodiment of the present principles. As explained in relation to FIG. 5, an atlas is an image packing patches, a patch being a picture obtained by projecting a part of the points of the 3D scene.

In the example of FIG. 6, atlas 60 comprises a first part 61 comprising the texture information of the points of the 3D scene that are visible from a point of view and one or more second parts 62. The texture information of first part 61 may for example be obtained according to an equirectangular projection mapping, an equirectangular projection mapping being an example of spherical projection mapping. In the example of FIG. 6, the second parts 62 are arranged at the left and right borders of first part 61 but the second parts may be arranged differently. Second parts 62 comprise texture information of parts of the 3D scene that are complementary to the part visible from the point of view. The second parts may be obtained by removing from the 3D scene the points that are visible from the first viewpoint (the texture of which being stored in the first part) and by projecting the remaining points according to the same point of view. The latter process may be reiterated iteratively to obtain at each time the hidden parts of the 3D scene. According to a variant, the second parts may be obtained by removing from the 3D scene the points that are visible from the point of view, for example a central point of view, (the texture of which being stored in the first part) and by projecting the remaining points according to a point of view different from the first point of view, for example from one or more second point of view of a space of view centred onto the central point of view (e.g. the viewing space of a 3DoF rendering).

First part 61 may be seen as a first large texture patch (corresponding to a first part of the 3D scene) and the second parts 62 comprises smaller textures patches (corresponding to second parts of the 3D scene that are complementary to the first part). Such an atlas has the advantage to be compatible at the same time with 3DoF rendering (when rendering only first part 61) and with 3DoF+/6DoF rendering.

Figure 7:
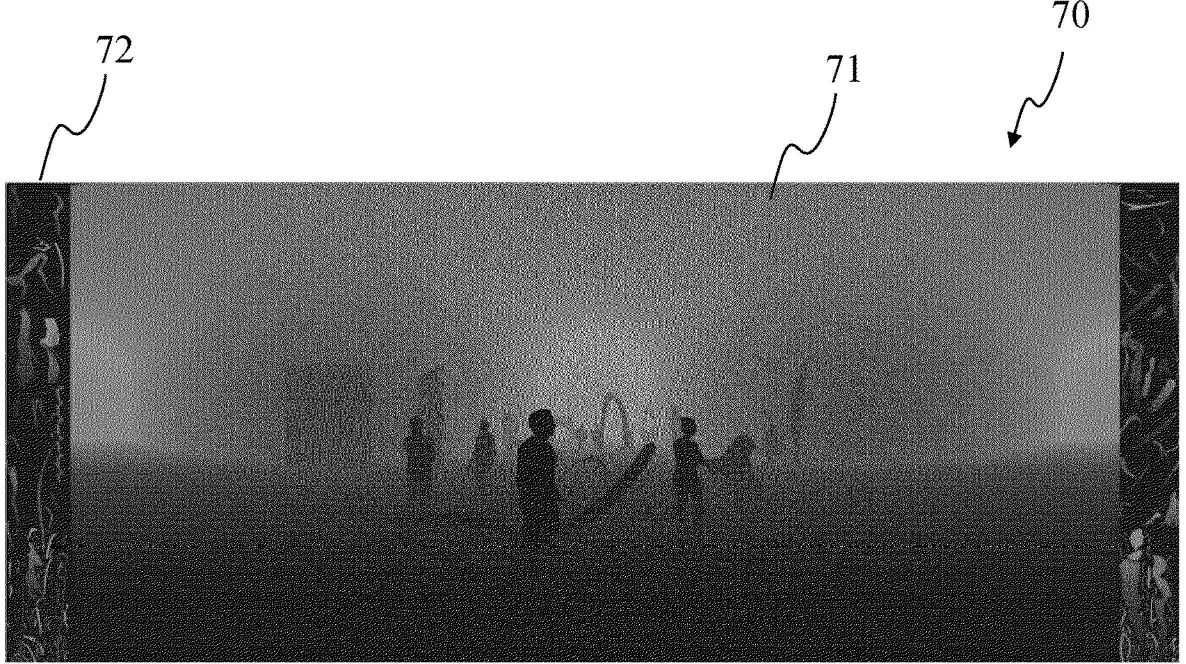
FIG. 7 shows an example of an atlas comprising the depth information of the points of the 3D scene of FIG. 6, according to a non-limiting embodiment of the present principles.

FIG. 7 shows an example of an atlas 70 comprising the depth information of the points of the 3D scene of FIG. 6, according to a non-limiting embodiment of the present principles. Atlas 70 may be seen as the depth image corresponding to texture image 60 of FIG. 6.

Atlas 70 comprises a first part 71 comprising the depth information of the points of the 3D scene that are visible from the central point of view and one or more second parts 72. Atlas 70 may be obtained in a same way as atlas 60 but contains the depth information associated with the points of the 3D scene instead of the texture information.

For 3DoF rendering of the 3D scene, only one point of view, typically the central point of view, is considered. The user may rotate his head in three degrees of freedom around the first point of view to watch various parts of the 3D scene, but the user cannot move this unique point of view. Points of the scene to be encoded are points which are visible from this unique point of view, and only the texture information is needed to be encoded/decoded for the 3DoF rendering. There is no need to encode points of the scene that are not visible from this unique point of view for a 3DoF rendering as the user cannot access to them.

With regard to 6DoF rendering, the user may move the viewpoint everywhere in the scene. In this case, it is required to encode every point (depth and texture) of the scene in the bitstream as every point is potentially accessible by a user who can move his/her point of view. At the encoding stage, there is no means to know, a priori, from which point of view the user will observe the 3D scene.

With regard to 3DoF+ rendering, the user may move the point of view within a limited space around a central point of view. This enables to experience parallax. Data representative of the part of the scene visible from any point of the space of view is to be encoded into the stream, including the data representative of the 3D scene visible according to the central point of view (i.e. first parts 61 and 71). The size and shape of the space of view may for example be decided and determined at the encoding step and encoded in the bitstream. The decoder may obtain this information from the bitstream and the renderer limits the space of view to the space determined by the obtained information. According to another example, the renderer determines the space of view according to hardware constraints, for example in relation to capabilities of the sensor(s) that detects the movements of the user. In such a case, if, at the encoding phase, a point visible from a point within the space of view of the renderer has not been encoded in the bitstream, this point will not be rendered. According to a further example, data (e.g. texture and/or geometry) representative of every point of the 3D scene is encoded in the stream without considering the rendering space of view. To optimize the size of the stream, only a subset of the points of the scene may be encoded, for instance the subset of points that may be seen according to a rendering space of view.

The patches are created to be sufficiently non-redundant and complementary. A process to generate patches from Multi-view +Depth (MVD) representation of a 3D scene consists in "pruning" the input source views to remove any redundant information. To do so, each input view (color+depth) are iteratively pruned one after the other. A set of unpruned views, called basic views, is first chosen among the source views and is fully transmitted. The set of remaining views, called additional views, is then iteratively processed to remove information (in terms of color and depth similarity) redundant with the basic views and with the already pruned additional view. Color or depth values of pruned pixels is replaced by a predetermined value, for example 0 or 255.

Figure 8:
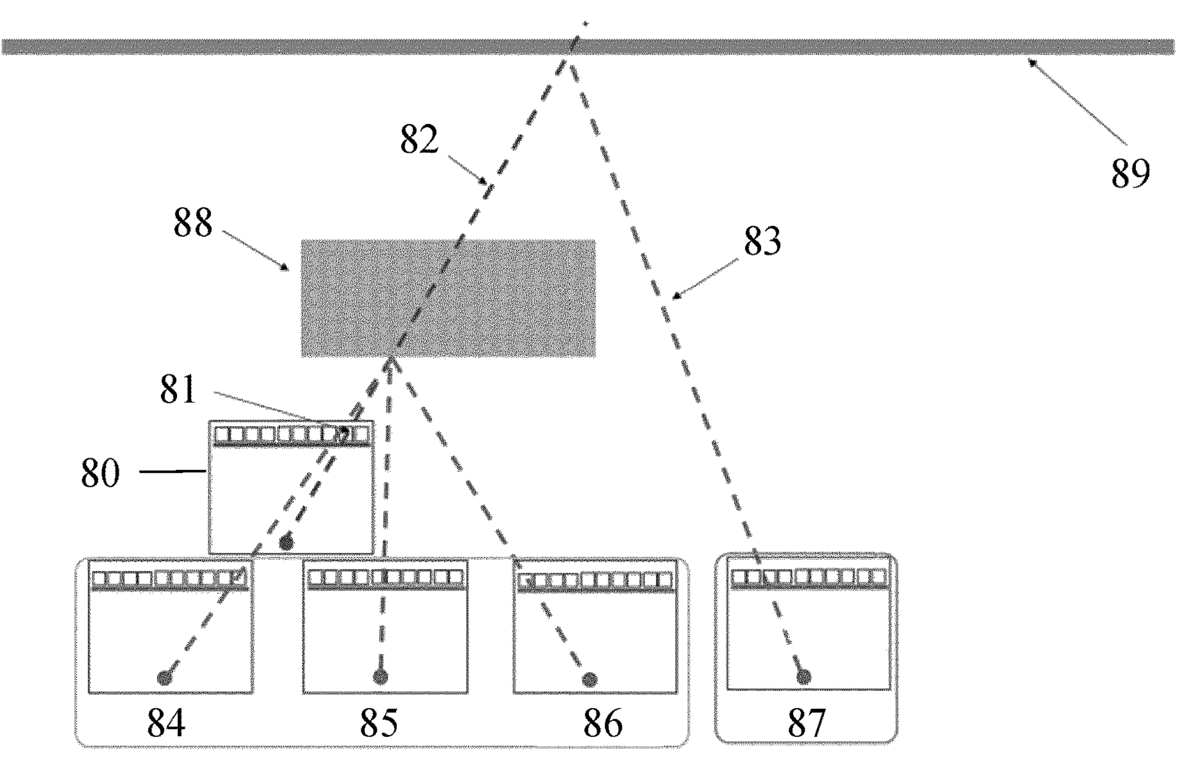
FIG. 8 illustrates a process used by a view synthesizer when generating an image for a given viewport from a non-pruned MVD frame, according to a non-limiting embodiment of the present principles.

FIG. 8 illustrates a process used by a view synthesizer 231 of FIG. 2 when generating an image for a given viewport from a non-pruned MVD frame. For conveying a volumetric video, a key step consists in removing redundant information between basic and additional views. However, even if it considerably decreases the amount of information to transmit, simply removing redundant information without any other signaling may considerably alter the view synthesis process at the decoding stage and strongly decrease the end-user experience. When trying to synthesize a pixel 81 for a viewport 80 to synthesize, a synthesizer (e.g. circuit 231 of FIG. 2) un-projects a ray (e.g. rays 82 and 83) passing by this given pixel and checks out the contribution of each source camera 84 to 87 along this ray. As illustrated in FIG. 8, when some objects in the scene create occlusions from one camera to another or when visibility cannot be ensured due to the camera setup, a consensus between all source cameras 84 to 87 regarding the properties of the pixel to synthesize may not be found. In the example of FIG. 8, a first group of 3 cameras 84 to 86 "vote" to use the color of the foreground object 88 to synthesize pixel 81 as they all "see" this object along the ray to synthesize. A second group of 1 single camera 87 cannot see this object because it is outside of its viewport. Thus, camera 87 "votes" for the background object 89 to synthesize pixel 81. A strategy to disambiguate such a situation is to blend and/or merge each camera contribution by a weight depending on their distance to the viewport to synthesize. In the example of FIG. 8, the first group of cameras 84 to 86 brings the biggest contribution as they are more numerous and as they are closer from the viewport to synthesize. In the end, pixel 81 would be synthesized making use of the properties of the foreground object 88, as expected.

Figure 9:
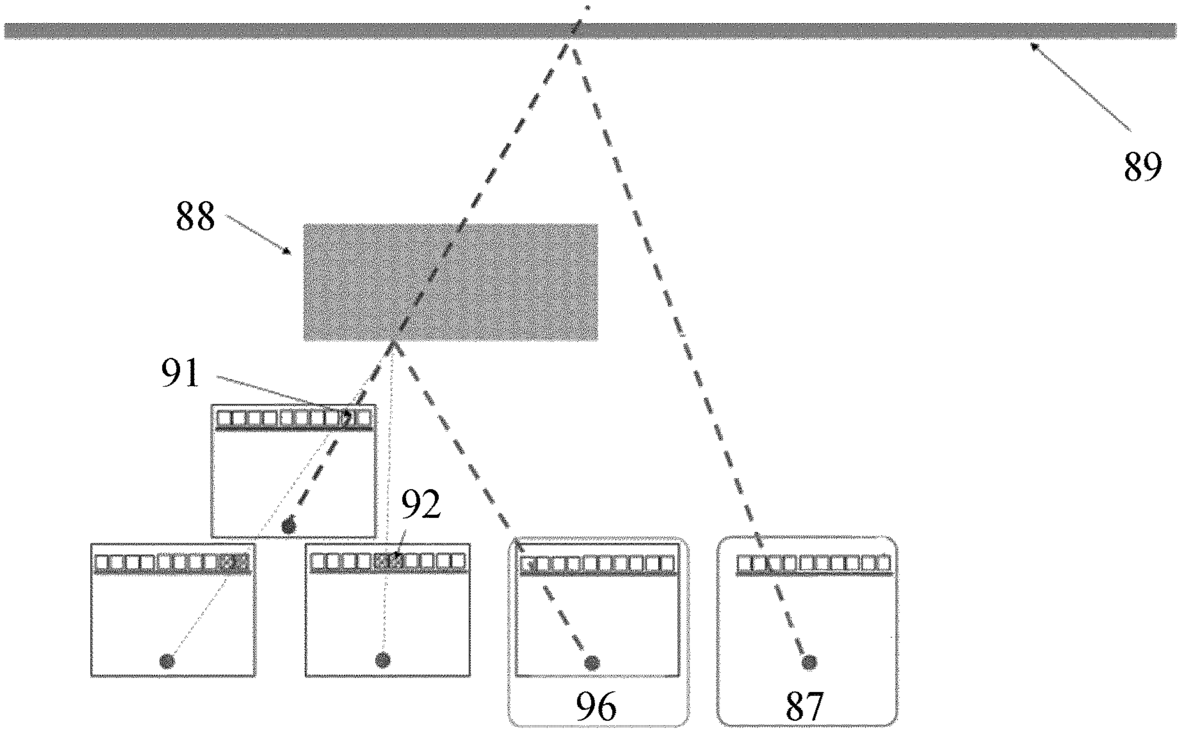
FIG. 9 illustrates the same view synthesizing than in FIG. 8 from a pruned MVD frame, according to a non-limiting embodiment of the present principles.

FIG. 9 illustrates the same view synthesizing than in FIG. 8 from a pruned MVD frame. In a pruned MVD frame, pixels of cameras that share the same information is cleared and are not transmitted or considered anymore. In the example of FIG. 9, the previous group of 3 cameras is now reduced to 1 single camera 96 carrying the information of foreground object 88. Corresponding pixel information 92 in views from cameras 84 and 85 has been pruned. The second group of cameras related to background object 89 is not changed and comprises only the view of camera 87. In that case, the contribution of the background to synthesize pixel 91 is no longer negligible regarding the contribution of the foreground as the "opposition" now comes down to a 1 vs 1. Even if the weight of object 88 is still slightly higher than the weight of the background 89, the blending of the two contributions would contain a significant amount coming from the background which does not correspond to what a user is expecting and leads to visual artifacts. Thus, having lost the information of contribution of some cameras after the pruning stage may be critical at the decoding stage when trying to synthesize a new view from an atlas.

According to the present principles, a method is disclosed to overcome these drawbacks. At the encoding stage, a pruning graph is obtained. A pruning graph constrains the pruning of each camera to be done with respect to a given subgroup of other cameras. Data representative of the pruning graph are encoded in the data stream and provided to the decoder in a compact way. At the decoding stage, the pruning graph may be recovered making use of these metadata and is used to restore the information of contribution of every pruned camera.

FIG. 10 illustrates a 4×4 multi-view frame and an example pruning graph for such a MVD frame. According to the present principles, for each camera (i.e. view 111 to 144), a set of other cameras is determined. Each camera is associated by a pruning precedence relation to zero, one or several other cameras in an acyclic manner (i.e. the pruning graph obtained from the pruning precedence relation does not comprise any cycle). To have an efficient pruning, precedence relations are selected so that two connected views have a high potential amount of redundancies. This potential may be, for example, determined on the basis of the distance between the optical center of the two cameras of interest, their overlapping ratio or the angle/distance between their optical axis. To obtain an acyclic graph a 2-step strategy may be envisioned by, first, connecting in a dense manner all cameras depending on the chosen criterion for the precedence and, second, pruning the obtained graph in a greedy manner to keep the minimal amount of connections guarantying the acyclic feature. The basic views (view 133 in the example of FIG. 10) does not point toward any other camera as a basic view is not pruned. Some views (111, 114, 141 and 144 in the example of FIG. 10) have no predecessor in the graph.

During the pruning procedure, a pruning order is determined so that a camera will always be pruned after all its parents in the sense of the pruning precedence. In the example of FIG. 10, a pruning order may be (133, 123, 132, 134, 143, 113, 122, 124, 131, 142, 144, 112, 114, 121, 141). The pruning procedure of all cameras is performed following this order. A pixel of the camera to prune is pruned with respect to the cameras it is related to, if and only if, it can be pruned with respect to every camera of the set it refers to (i.e. the same information is carried by all referent cameras). If one part of the parent camera set has already been pruned during the process, to avoid any drifting effect, the pruning is recursively tried with respect to its unique or multiple parents until a non-pruned area has been found out. If a consensus is not found, the considered pixel to prune is not pruned and its value is unchanged. Otherwise, the pixel (and its value) is discarded. On each two by two comparison to occur on a path of the pruning tree, there is small alignment error in depth. While the error is lower than a threshold for a comparison between two close cameras (i.e. topologically neighbor views), it is not the case for two remote cameras which are indirectly compared through a path of the pruning tree. The drifting effect is the accumulation of small alignment errors in depth between cameras along a path of the pruning tree.

To be used at the decoding stage, the pruning graph is encoded in the data stream according to a non-limitative embodiment of the present principles.

In a first embodiment, data representative of every precedence relation of the pruning graph are encoded as a list comprising, for each camera, the list of cameras it is related to, according to a syntax format as depicted in Table 2, each camera being identified by its position in the camera parameters list, following a syntax format as proposed in Table 1. If the number of cameras is small (for instance lower than 64), then a mask/bit array may be used alternatively to describe the pruning precedence, each ith bit being set to 1 if a preceding relation occurs with the ith camera, for example following a syntax format as described in Table 3.

TABLE 1

| | Descriptor |
|---|---|
| camera_params_list( ) { | |
| num_cameras_minus1 | u(16) |
| for ( i= 0; i <= num_cameras_minus1; i++) { | |
| cam_pos_x[ i ] | u(32) |
| cam_pos_y[ i ] | u(32) |
| cam_pos_z[ i ] | u(32) |
| cam_yaw[i ] | u(32) |
| cam_pitch[ i ] | u(32) |
| cam_roll[ i ] | u(32) |
| } | |
| intrinsic_params_equal_flag | u(1) |
| for ( i = 0; i <= intrinsic_params_equal_flag ? 0 : num_cameras_minus1; i++ ) | |
| camera_intrinsics( [ i ] ) | |
| depth_quantization_params_equal_flag | u(1) |
| for ( i = 0; i <= depth_quantization_equal_flag ? 0 : num_cameras_minus1; i++ ) | |
| depth_quantization( [ i ] ) | |
| } | |

TABLE 2

| | Descriptor |
|---|---|
| camera_precedence_list( ) { | |
| num_cameras_minus1 | u(16) |
| for ( i= 0; i <= num_cameras_minus1; i++) { | |
| Num_precedences_minus1[ i ] | u(16) |
| for ( j= 0; j <= num_precedences_minus1[i]; j++) | |
| cam_precedence[ i ][j] | u(16) |
| } | |

TABLE 3

| | Descriptor |
|---|---|
| camera_precedence_list( ) { | |
| num_cameras_minus1 | u(16) |
| for ( i= 0; i <= num_cameras_minus1; i++) | |
| cam_precedence_mask[i] | u(64) |

In another embodiment, the pruning relation is integrated within the camera parameters list (either as an array or as a mask) as a new parameter for each camera, for instance according to a syntax format as proposed in Table 4 and Table 5.

TABLE 4

| | Descriptor |
|---|---|
| params_list( ) { | |
| num_cameras_minus1 | u(16) |
| for ( i= 0; i <= num_cameras_minus1; i++) { | |
| cam_pos_x[ i ] | u(32) |
| cam_pos_y[ i ] | u(32) |
| cam_pos_z[ i ] | u(32) |
| cam_yaw[i ] | u(32) |
| cam_pitch[ i ] | u(32) |
| cam_roll[ i ] | u(32) |
| } | |
| intrinsic_params_equal_flag | u(1) |
| for ( i = 0; i <= intrinsic_params_equal_flag ? 0 : num_cameras_minus1; i++ ) | |
| camera_intrinsics( [ i ] ) | |
| depth_quantization_params_equal_flag | u(1) |
| for ( i = 0; i <= depth_quantization_equal_flag ? 0 : num_cameras_minus1; i++ ) | |
| depth_quantization( [ i ] ) | |
| precedence_params_equal_flag | u(1) |
| for ( i= 0; i <= precedence_params_equal_flag ? 0 : num_cameras_minus_1; i++) { | |
| Num_precedences_minus1[ i ] | u(16) |
| for ( j= 0; j <= num_precedences_minus_1[i]; j++) | |
| cam_precedence[ i ][j] | u(16) |
| } | |
| } | |

TABLE 5

| | Descriptor |
|---|---|
| camera_params_list( ) { | |
| num_cameras_minus1 | u(16) |
| for ( i= 0; i <= num_cameras_minus1; i++) { | |
| cam_pos_x[ i ] | u(32) |
| cam_pos_y[ i ] | u(32) |
| cam_pos_z[ i ] | u(32) |
| cam_yaw[i ] | u(32) |
| cam_pitch[ i ] | u(32) |
| cam_roll[ i ] | u(32) |
| } | |
| intrinsic_params_equal_flag | u(1) |
| for ( i = 0; i <= intrinsic_params_equal_flag ? 0 : num_cameras_minus1; i++ ) | |
| camera_intrinsics( [ i ] ) | |
| depth_quantization_params_equal_flag | u(1) |
| for ( i = 0; i <= depth_quantization_equal_flag ? 0 : num_cameras_minus1; i++ ) | |
| depth_quantization( [ i ] ) | |
| precedence_params_equal_flag | u(1) |
| for ( i= 0; i <= precedence_params_equal_flag ? 0 : num_cameras_minus1; i++) | |
| cam_precedence_mask[i] | u(64) |
| } | |

At the decoding stage, the pruning graph is recovered from the metadata and used to correctly handle the weighting strategy of the renderer. In an embodiment, for each pixel to synthesize, the contribution of all cameras is considered iteratively. For each camera providing a valid contribution, every camera having been pruned with respect to this camera is iteratively considered by browsing the pruning graph in the pruning order (from a parent toward its children). If a browsed camera has been pruned with respect to the camera of interest for the considered pixel, its weight is combined (e.g. added) to the weight of the current camera and its children are then processed similarly. If a browsed camera has not been pruned with respect to this camera for the considered pixel because it holds a different valid information, then the browsing is stopped along the associated branch of the graph and the weight of the camera of interest remains unchanged.

According to the present principles, the pruned camera contribution is correctly recovered at the decoder stage after pruning, preventing visual artifacts as described in relation to FIG. 9.

FIG. 11 illustrates a method 110 for encoding a multi-view frame in a data stream according to a non-limiting embodiment of the present principles. At a step 111, a MVD frame is obtained from a source. At this step, the MVD frames requires a huge amount of data to be encoded. At a step 112, a graph is determined linking views of the MVD according to a pruning precedence relation. The graph is built to be acyclic, that is no view can be preceded in the pruning process by a view it precedes itself. Some views have no predecessor and views which are not meant to be pruned (also called basic views) have no successor in the graph. At a step 113, views are pruned according to the precedence relations of the graph as described in relation to FIG. 10. At this stage, redundant information (color and depth) of the initial MVD obtained at step 111 has been removed and the result requires less data to be encoded. Remaining useful information may be organized in a unique frame called an atlas as described in relation FIGS. 5 to 7. At a step 114, the pruned MVD or the corresponding atlas is encoded in the stream in association with dedicated metadata. According to the present principles, the pruning precedence relations of the pruning graph are also encoded in the stream, following, for example, one of the proposed syntax formats. In a further step, the data stream may be stored in a memory or non-transitory storage medium or transmitted over a network or a data bus to a remote or a local device.

FIG. 12 illustrates a method 120 for decoding a pruned multi-view frame from a data stream according to a non-limiting embodiment of the present principles. At a step 121, a data stream is obtained and data representative of a pruned MVD, for example in the format of an atlas, is obtained from the data stream. For instance, the pruned MVD is decoded from data by using a video codec. At a step 122, a pruning graph linking views of the MVD is obtained from the data stream. Steps 121 and 122 may be performed in any order or in parallel. The pruning graph is an acyclic structure of pruning precedence relations between the views of the MVD as described in detail in the present application. At a step 123, a viewport frame is generated for a viewing pose (i.e. location and orientation in the 3D space of the renderer). For pixels of the viewport frames, the weight of the contribution of each view (also called 'camera' in the present application) is determined according to the pruning precedence relations between views of the obtained pruning graph. For each camera providing a valid contribution, every camera having been pruned with respect to this camera is iteratively considered by browsing the pruning graph in the pruning order (from a parent toward its children). If a browsed camera has been pruned with respect to the camera of interest for the considered pixel, its weight is combined (e.g. added) to the weight of the current camera and its children are then processed similarly. If a browsed camera has not been pruned with respect to this camera for the considered pixel because it holds a different valid information, then the browsing is stopped along the associated branch of the graph and the weight of the camera of interest remains unchanged.

In an embodiment, at the decoding stage, the pruning graph may be used to un-prune the pruned input views. According to the present principles, every source view of the received pruned MVD is reconstructed by recovering the missing redundant parts suppressed by the pruning process. To do so, a reverse procedure is applied. Starting from the root node to the leaves, a valid (non-pruned) pixel p of a view associated to a node N is considered. Then:

1) Pixel p is de-projected onto the (not yet "unpruned") views associated with the children of its view and, if it contributes to their viewport, then, the associated de-projected pixels status is fetched.
2) If a de-projected pixel is identified as pruned (and has no valid value yet) then its color and depth values are set to the ones of pixel p (color and/or depth) and the process is iteratively repeated to the children of the latter view.
3) If a de-projected pixel is identified as non-pruned (and has a valid value), then its color and depth values are left unchanged and no more inspection of the graph is performed toward children of this latter view.
4) If the pixel p did not fall within the viewport of one of its children, then the process is recursively repeated to the grandson.

Doing so makes possible to feed a multiview display, which requires to display all views of the MVD content at all time instants (and not only one synthesized virtual view as in an HIVID), while having transmitted a pruned content at reduced bit rate.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding views of a multi-view frame in a data stream, the method comprising:
- obtaining an explicitly stored acyclic graph data structure linking views of the multi-view frame, links of the acyclic graph being representative of a pruning precedence relation, at least one basic view of the multi-view frame having no pruning precedence link;
- pruning pixels of views of the multi-view frame in an order determined so that a given view is pruned after views linked to the given view by a pruning precedence link, wherein at least one pixel of the given view is pruned when the at least one pixel corresponds to information encoded in a pixel of a view transitively linked to the given view by a pruning precedence link such that the pruning is executable in a single pass along paths of the acyclic graph without requiring sequential multi-phase pruning; and
- encoding the acyclic graph as a graph structure including identifiers for nodes and edges, the at least one basic view, and the pruned views of the multi-view frame in the data stream.

2. The method of claim 1, wherein the pruning pixels of views comprises replacing the value of the pixels by a determined value.

3. The method of claim 1, wherein the acyclic graph is signaled in the data stream as a list comprising, for each view of the multi-view frame, linked views.

4. The method of claim 1, wherein the acyclic graph encodes both basic and additional views in a single unified pruning hierarchy, such that pruning precedence applies uniformly to all views.

5. A device for encoding views of a multi-view frame in a data stream, the device comprising a processor configured for:
- obtaining an explicitly stored acyclic graph data structure linking views of the multi-view frame, links of the acyclic graph being representative of a pruning precedence relation, at least one basic view of the multi-view frame having no pruning precedence link;
- pruning pixels of views of the multi-view frame in an order determined so that a given view is pruned after views linked to the given view by a pruning precedence link; wherein at least one pixel of the given view is pruned when the at least one pixel corresponds to information encoded in a pixel of a view transitively linked to the given view by a pruning precedence link such that the pruning is executable in a single pass along paths of the acyclic graph without requiring sequential multi-phase pruning; and
- encoding the acyclic graph as a graph structure including identifiers for nodes and edges, the at least one basic view, and the pruned views of the multi-view frame in the data stream.

6. The device of claim 5, wherein the pruning pixels of views comprises replacing the value of the pixels by a determined value.

7. The method of claim 5, wherein the acyclic graph is signaled in the data stream as a list comprising, for each view of the multi-view frame, linked views.

8. A method of decoding views of a multi-view frame from a data stream, the method comprising:
- obtaining pruned views of the multi-view frame from the data stream and at least one basic view being unpruned;
- obtaining an explicitly stored acyclic graph data structure from the data stream, the acyclic graph linking views of the multi-view frame, links of the acyclic graph being representative of a pruning precedence relation, the at least one basic view of the multi-view frame having no pruning precedence link; and
- generating a viewport frame according to a viewing pose by determining the contribution of each view of the multi-view frame as a function of the pruning precedence relations of the acyclic graph, wherein the reconstruction of pruned pixels from the acyclic graph is performed in a single pass along graph paths without requiring sequential multi-phase pruning and without use of patch-group metadata, weights per patch, or per-visibility lists.

9. The method of claim 8, wherein a pruned pixel of a pruned view has a determined value.

10. The method of claim 9, wherein the determined value is not a color value or a depth value.

11. The method of claim 10, wherein the determined value comprises a unique marker value indicating pruning status that is neither a valid pixel color nor a depth, enabling efficient detection at the decoder.

12. The method of claim 8, wherein the acyclic graph is signaled in the data stream as a list comprising, for each view of the multi-view frame, linked views.

13. The method of claim 8, wherein reconstruction of pruned pixels from the acyclic graph is performed without use of patch-group metadata, weights per patch, or per-visibility lists.

14. A device for decoding views of a multi-view frame from a data stream, the device comprising a processor configured for:
- obtaining pruned views of the multi-view frame from the data stream and at least one basic view being unpruned;
- obtaining an explicitly stored acyclic graph data structure from the data stream, the acyclic graph linking views of the multi-view frame, links of the acyclic graph being representative of a pruning precedence relation, the at least one basic view of the multi-view frame having no pruning precedence link; and generating a viewport frame according to a viewing pose by determining the contribution of each view of the multi-view frame as a function of the pruning precedence relations of the acyclic graph, wherein the reconstruction of pruned pixels from the acyclic graph is performed in a single pass along graph paths without requiring sequential multi-phase pruning and without use of patch-group metadata, weights per patch, or per-visibility lists.

15. The device of claim 14, wherein a pruned pixel of a pruned view has a determined value.

16. The device of claim 15, wherein the determined value is not a color value or a depth value.

17. The device of claim 14, wherein the acyclic graph is signaled in the data stream as a list comprising, for each view of the multi-view frame, linked views.

18. A non-transitory computer readable storage medium comprising instructions which, when executed by one or more processors, cause the one or more processors to perform the method of claim 1.

19. A non-transitory computer readable storage medium comprising instructions which, when executed by one or more processors, cause the one or more processors to perform the method of claim 8.

20. A non-transitory computer readable storage medium comprising instructions which, when executed by one or more processors, cause the one or more processors to:

store data representative of views of a multi-view frame comprising pruned views and at least one basic view being unpruned; and store data representative of an explicitly stored acyclic graph data structure linking views of the multi-view frame, links of the graph being representative of a view pruning precedence relation, the at least one basic view of the multi-view frame having no pruning precedence link, wherein the acyclic graph encodes both basic and additional views in a single unified pruning hierarchy enabling pruning and reconstruction in a single pass without requiring sequential multi-phase pruning or reliance on patch-group metadata, weights per patch, or per-visibility lists.

21. The non-transitory computer readable storage medium of claim 20, wherein a pruned pixel of a pruned view has a determined value.

22. The non-transitory computer readable storage medium of claim 21, wherein the determined value is not a color value or a depth value.

23. The non-transitory computer readable storage medium of claim 20, wherein the acyclic graph is signaled in the data stream as a list comprising, for each view of the multi-view frame, linked views.

* * * * *